(12) United States Patent
Bervang

(10) Patent No.: US 7,726,941 B2
(45) Date of Patent: Jun. 1, 2010

(54) METHODS OF HANDLING WIND TURBINE BLADES AND MOUNTING SAID BLADES ON A WIND TURBINE, SYSTEM AND GRIPPING UNIT FOR HANDLING A WIND TURBINE BLADE

(75) Inventor: Anders Greve Bervang, Videbaek (DK)

(73) Assignee: Vestas Wind Systems A/S (DK)

( * ) Notice: Subject to any disclaimer, the term of this patent is extended or adjusted under 35 U.S.C. 154(b) by 482 days.

(21) Appl. No.: 11/738,685

(22) Filed: Apr. 23, 2007

(65) Prior Publication Data

US 2007/0266538 A1 Nov. 22, 2007

Related U.S. Application Data

(63) Continuation of application No. 10/503,192, filed on Jul. 30, 2004, now Pat. No. 7,207,777.

(51) Int. Cl.
*F03D 11/04* (2006.01)
(52) U.S. Cl. .................... 416/1; 416/119; 416/142; 416/244 R; 416/DIG. 5
(58) Field of Classification Search ............ 416/1, 416/119, 142, 224 R, DIG. 6; 290/43, 54, 290/55
See application file for complete search history.

(56) References Cited

U.S. PATENT DOCUMENTS 2,335,692 A * 11/1943 Murray .................. 414/346
2,725,241 A * 11/1955 Leonard, Jr .............. 410/44

FOREIGN PATENT DOCUMENTS

| EP | 1101934 | 5/2001 |
| JP | 02-2390 | 1/1990 |
| JP | 07-13885 | 3/1995 |
| JP | 2002147340 | 5/2002 |

* cited by examiner

*Primary Examiner*—Igor Kershteyn
(74) *Attorney, Agent, or Firm*—St. Onge Steward Johnston & Reens LLC

(57) ABSTRACT

The invention relates to methods of handling wind turbine blades and mounting said blades on a wind turbine, said method comprising the steps of lifting a wind turbine hub to the nacelle of wind turbine with a lifting system and mounting the hub on the nacelle. Further, the method comprises the steps of gripping at least one wind turbine blade with a lifting system including at least one gripping unit for handling wind turbine blades, lifting said at least one wind turbine blade into close proximity to said hub, and mounting said at least one wind turbine blade on said hub.

The invention also relates to a gripping unit for handling a wind turbine blade during transport.

14 Claims, 14 Drawing Sheets

METHODS OF HANDLING WIND TURBINE BLADES AND MOUNTING SAID BLADES ON A WIND TURBINE, SYSTEM AND GRIPPING UNIT FOR HANDLING A WIND TURBINE BLADE

CROSS REFERENCE TO RELATED APPLICATION

This application is a continuation of, and claims the benefit of, U.S. application Ser. No. 10/503,192 filed on 30 Jun. 2004, the entire contents of which are herein incorporated by reference.

BACKGROUND OF THE INVENTION

The invention relates to methods of handling wind turbine blades and mounting said blades on a wind turbine, and a system and gripping unit for handling a wind turbine blade.

Modern wind turbines usually comprise a rotor with a considerable diameter and weight, as illustrated in FIG. 1. The diameter of modern rotors is approaching 100 to 150 meters and the rotor including the wind turbine hub and e.g. three wind turbine blades may add up to around 40 to 50 tons.

The usual way of mounting a wind turbine includes the steps of transporting the different elements to the site of the wind turbine, assembling the tower sections and the tower, lifting the wind turbine nacelle with a crane and mounting the nacelle on top of the tower, assembling the wind turbine rotor on the ground, and lifting the wind turbine rotor with the crane and mounting the rotor to the low speed shaft extending from the nacelle.

The usual way comprises a number of disadvantages which have become more and more problematic with the increasing size and weight of the wind turbine rotor.

Especially assembly of the wind turbine rotor on the ground is problematic as it requires a large area free of obstacles, which is planar and stable in order to be accessible for the assembly workers and the crane. With a rotor diameter of 100 meters, the area in question must exceed 5000 m2.

Further, lifting of the rotor to the nacelle is rather complicated, as the rotor must be turned 90 degrees in midair.

In other lifting systems, it is known to pre-mount the wind turbine hub on the nacelle and then lift each wind turbine blade successively to a position next to hub and perform the mounting of the blades. The lifting is performed with the wind turbine blades lying in a number of slings.

This lifting system comprises a number of disadvantages and one of them is the fact that the blade has to be horizontal during lifting and mounting.

Further, the blade has to be positioned with the front facing downwards to the bottom of the slings in order not to be damaged. This only allows mounting of the blade on the hub in a production position which means that the hydraulic pitch system of the wind turbine has to be manually overruled and mechanical break force to be added to the low-speed axle of the turbine in order to keep the rotor system from rotating during mounting.

BRIEF SUMMARY OF THE INVENTION

The invention establishes a wind turbine without the above-mentioned disadvantages.

Especially, the invention establishes a lifting system which is flexible and easy to use on many geographic sites regardless of the surroundings.

In accordance with the invention, a method of handling wind turbine blades and mounting said blades on a wind turbine is stated, said method comprising the steps of:

lifting a wind turbine hub to the nacelle of a wind turbine with a lifting system and mounting the hub on the nacelle or lifting the wind turbine hub and the nacelle together with a lifting system and mounting the nacelle, including the hub, on a wind turbine tower, lifting at least one wind turbine blade with a lifting system for handling wind turbine blades, lifting said at least one wind turbine blade into a vertical position below and in close proximity to said hub, and mounting said at least one wind turbine blade on said hub.

Hereby, it is possible to handle and mount a wind turbine blade in an advantageous manner.

Especially, the possibility of lifting the wind turbine blade to a position below the hub instead of to a higher position is advantageous as this allows the use of cranes with a lower maximum height. The crane costs are increased significantly with the otherwise required maximum height.

In an embodiment of the invention, lifting of at least one wind turbine blade is performed from an initial position which is substantially horizontal in relation to the longitudinal axis of the blade to a final position which is substantially vertical and in close proximity to said hub. Hereby, it is possible to lift the wind turbine blade from a horizontal position e.g. on the ground or on the deck of a ship to a vertical mounting position.

In a further embodiment of the invention, at least one wind turbine blade is mounted on said wind turbine hub before lifting of the hub and at least one wind turbine blade is mounted on said wind turbine hub after lifting of the hub. Mounting on the ground of at least one wind turbine blade, e.g. two blades on the hub, is advantageous and only possible since the blades may point upwards during mounting and lifting.

In an even further embodiment of the invention, at least the mounting of said at least one wind turbine blade on said hub is performed with the blade in a substantially vertical position. By lifting the blade to a vertical position, it is possible to lift the blade into a position just below the bar/jip of the crane and use the crane more efficiently by lifting the blade higher which allows for a smaller crane to perform the same lift.

In a fourth embodiment of the invention, lifting and mounting of said wind turbine blade is performed with the blade in non-production position in relation to the wind. The blade in a non-production position in relation to the wind is to be understood as the front (or tail) of the blade facing the wind whereby any pull from the wind is avoided.

Hereby, it is possible to lift and mount the wind turbine blades during higher wind speeds than the known systems since mounting in a non-production position is feasible. Further, it is not necessary to turn one or more of the blades during the mounting.

The yaw mechanism of the nacelle will keep the wind turbine turned against the wind.

In a fifth embodiment of the invention, lifting is performed with a gripping unit gripping said wind turbine blade. By using a gripping unit, the blade is easier to control during lifting and this allows for vertical lifting.

In a sixth embodiment of the invention, lifting from a substantially horizontal to a final vertical position is enhanced by a lever arm and a weight attached to the gripping unit. By using a lever arm and a weight attached to the gripping unit, it is possible to create a gripping unit which is forced by gravity to make a rotating movement from horizontal to vertical position and thus enhance control of the blade as the weight center point of the system is moved away from the blade and the lifting positions on the blade.

In a seventh embodiment of the invention, the gripping unit grips a wind turbine blade in at least two lifting positions.

In an eighth embodiment of the invention, the gripping unit performs the grip by forcing a number of clamping jaws against the sides of the wind turbine blade in at least two lifting positions. By using clamping jaws against the side of the blade it is possible to obtain a large contact surface.

In a ninth embodiment of the invention, the gripping unit grips a wind turbine blade in at least two lifting positions, said lifting positions being symmetrically positioned around the center point of said wind turbine blade.

In a tenth embodiment of the invention, lifting of said at least one wind turbine blade is performed by at least one crane lifting said gripping unit in said at least two lifting positions. By using at least two lifting positions, lifting safety is enhanced.

In an eleventh embodiment of the invention, said at least one wind turbine blade is controlled by one or more wires connected to said crane or to one or more winches. By using one or more wires to control the blade, lifting safety is enhanced.

In accordance with the invention, a further method of handling wind turbine blades and mounting said blades on a wind turbine is stated, said method comprising the steps of:

lifting a wind turbine hub to the nacelle of a wind turbine with a lifting system and mounting the hub on the nacelle or lifting the wind turbine hub and the nacelle as one with a lifting system and mounting the nacelle, including the hub, on a wind turbine tower, gripping at least one wind turbine blade with a lifting system including at least one gripping unit for handling wind turbine blades, lifting said at least one wind turbine blade into close proximity of said hub, and mounting said at least one wind turbine blade on said hub.

Hereby, it is possible to handle and mount a wind turbine blade in an advantageous manner.

In accordance with the invention, a system for handling wind turbine blades and mounting said blades on a wind turbine is stated, said system comprising a gripping unit for a wind turbine blade and a lifting system.

By using gripping means in relation to lifting a wind turbine blade, it is possible to perform the lift in a flexible and easy manner. Further, the risk of damage to the blade during lifting is reduced significantly as control of the blade is enhanced in a lifting action involving gripping of the blade.

In an embodiment of the invention, said lifting system includes a crane with a number of wires lifting and controlling said gripping unit. Hereby, an easy and safe lifting operation is made feasible.

In a further embodiment of the invention, at least one additional wire controlling said at least one wind turbine blade is connected to said blade with connection means such as a flexible cuff or a similar flexible band surrounding part of the tip of said blade. By establishing wired control points, e.g. at the outer ends of the blade being lifted, it is possible to control the blade more efficiently which allows lifting and mounting of wind turbine blades at higher wind speeds. Further, lifting and mounting may be less troublesome and quicker which reduces the required manpower and the costs in general.

In accordance with the invention, a gripping unit for handling a wind turbine blade is stated, said unit comprising gripping means. By using gripping means in relation to lifting of a wind turbine blade, it is possible to perform the lift in a flexible and easy manner. Further, the risk of damaging the blade during lifting is reduced significantly as control of the blade is enhanced in a lifting action involving gripping of the blade.

In an embodiment of the invention, said gripping means comprises at least two gripping points. By using at least two gripping points, a preferred relation between functionality and safety in relation to the lifting is achieved.

In a further embodiment of the invention, said gripping means comprises a curved surface following the shape of specific types of wind turbine blades. By adapting the surface shape of the gripping means to a specific type of wind turbine blade, it is possible to achieve a more firm and long-lasting grip of the blade and thus increase safety during lifting.

In an even further embodiment of the invention, the position of said gripping means is connected to a hydraulic, an electric or a pneumatic system for stepless adjustment of the position of the gripping means in relation to said wind turbine blade.

In a fourth embodiment of the invention, said gripping means may be changed from one size to another. The gripping jaws are hereby easily replaceable and are matched to suit the blade type to be handled.

Further, a wide gripping range is made possible.

In a fifth embodiment of the invention, said gripping means includes clamping jaws engaging with the surface of a wind turbine blade. By using clamping jaws, it is possible to apply extensive gripping force to the wind turbine blade in a controlled manner. Especially, it is possible to monitor the pressure that the clamping jaws place on the blade by measurements in the mechanical or hydraulic system associated with the clamping jaws and limit the force transferred onto the blade. Further, it is possible to ensure minimum force used in connection with gripping the blade.

In a sixth embodiment of the invention, said gripping means includes at least one stepless adjustable clamping jaw and at least one fixed clamping jaw, said jaws forming a clamping jaw set. By using pairs of clamping jaws comprising a fixed and a movable jaw, it is possible to create gripping means with less components performing the movements but with the same functionality as a system with pairs of movable jaws. By having fewer components perform the movements, improved operational reliability of the gripping means is ensured. Further, the cost of the gripping means is reduced as only one of the more complicated movable jaws is needed in a pair. By allowing the movable jaws to be adjustable in steps, it is possible to hold the blade in a firm grip regardless of the conditions e.g. a wet surface of the blade or the like.

Further, a wide gripping range is made possible.

In a seventh embodiment of the invention, said clamping jaws includes a friction surface layer. The condition of the wind turbine blade surface may be anything from soaking wet to perfectly dry and as such the clamping jaws must be prepared for the different conditions. By using a friction surface layer, it is possible to maintain the grip of the blade without having to increase the grip force e.g. if the blade surface becomes wet.

In an eighth embodiment of the invention, said friction surface layer comprises vulcanized rubber. Hereby, it is possible to avoid or at least minimize jaw marks on the wind turbine blade as the vulcanized rubber will protect the blade surface. In order to achieve max. production capacity from a wind turbine, it is important that the mounted wind turbine blades are without faults or marks. Further, the vulcanized rubber will ensure a firm grip of the blade regardless of the blade conditions as mentioned above.

In a ninth embodiment of the invention, said friction surface layer comprises at least one tread pattern. By using a tread pattern, e.g. known from vehicle tires, it is possible to maintain a firm grip of a wind turbine blade and further have rain or other moisture directed away from the contact surfaces between the jaws and the blade.

In a tenth embodiment of the invention, said at least one tread pattern includes one or more dents. By using dents, it is possible to direct and collect raindrops or other moisture in central places positioned away from the contact surfaces between the jaws and the blade.

In an eleventh embodiment of the invention, said clamping jaws include one or more vertical ribs. The clamping jaws are particularly exposed to pressure by the blade in a direction perpendicular to the longitudinal axis of the blade and as such, it is advantageous to add vertical ribs to the jaws, e.g. steel bars mounted on the back of the jaw surface facing the blade.

In a twelfth embodiment of the invention, said unit comprises two sets of jaws symmetrically positioned around the center point of a wind turbine blade.

The center point of the blade is the mass center point of the blade (or the blade and the gripping unit) in a direction perpendicular to the longitudinal axis of the blade. By positioning the sets of jaws symmetrically around the center point, less effort is required to turn the blade from one position to another e.g. from horizontal to vertical position.

In a thirteenth embodiment of the invention, said unit comprises a number of jaws sets, said sets being adapted to a given wind turbine blade type. In order to obtain a firm grip of the blade (and thus increase safety), it is crucial that the jaws are adapted to the wind turbine blade type being lifted.

Further, a wide gripping range is made possible.

In a fourteenth embodiment of the invention, said unit comprises two sets of clamping jaws. By using two sets of clamping jaws, a preferred relation between cost, functionality and safety of lifting is achieved.

In a fifteenth embodiment of the invention, said unit comprises a lever system comprising a lever arm and at least one weight. By using a lever system, it is possible to move the mass center of the wind turbine blade and gripping unit as one closer to the lifting positions and thus enhance control of the movement as well as make it easier on the lever system due to the force of gravity.

In a sixteenth embodiment of the invention, said lever system further comprises a hinge allowing the lever arm and at least one weight to be moved from a lifting position to a transportation position. Hereby, it is possible to create a gripping unit with a lever system which is compact during transport. In the transport phase, it is very important to keep the dimensions of the gripping unit compact in order to allow standardized transport such as container transport.

In a seventeenth embodiment of the invention, said lever system comprises a number of movable bolts connected to said hinge. By using movable bolts, it is possible to convert the gripping unit from use position into transportation position in an easy manner by means of standard tools.

BRIEF DESCRIPTION OF THE DRAWINGS

The invention will be described in the following with reference to the figures in which.

DETAILED DESCRIPTION OF THE INVENTION

Figure 1:
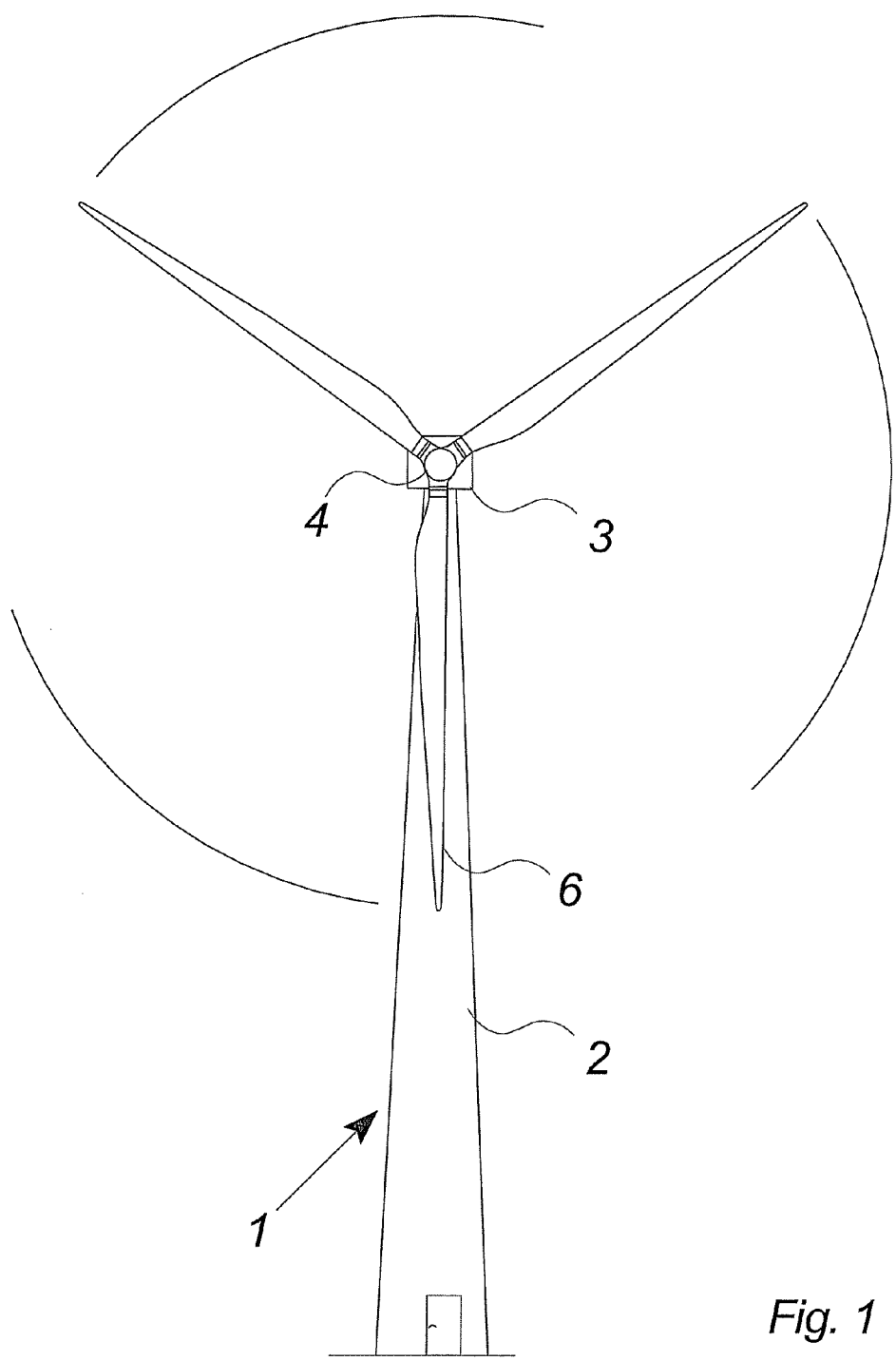
FIG. 1 shows a large modern wind turbine.

FIG. 1 shows a modern wind turbine 1 with a tower 2 and a wind turbine nacelle 3 positioned on top of the tower. The wind turbine rotor 5 is connected to the nacelle through the low speed shaft 6 extending from the nacelle front (shown in FIG. 2a).

As illustrated in the figure, winds over a certain level will activate the rotor and allow it to rotate perpendicularly to the wind. The rotation movement is converted into electric power which is usually supplied to the transmission grid as will be known by persons skilled within the area.

Figure 2A:
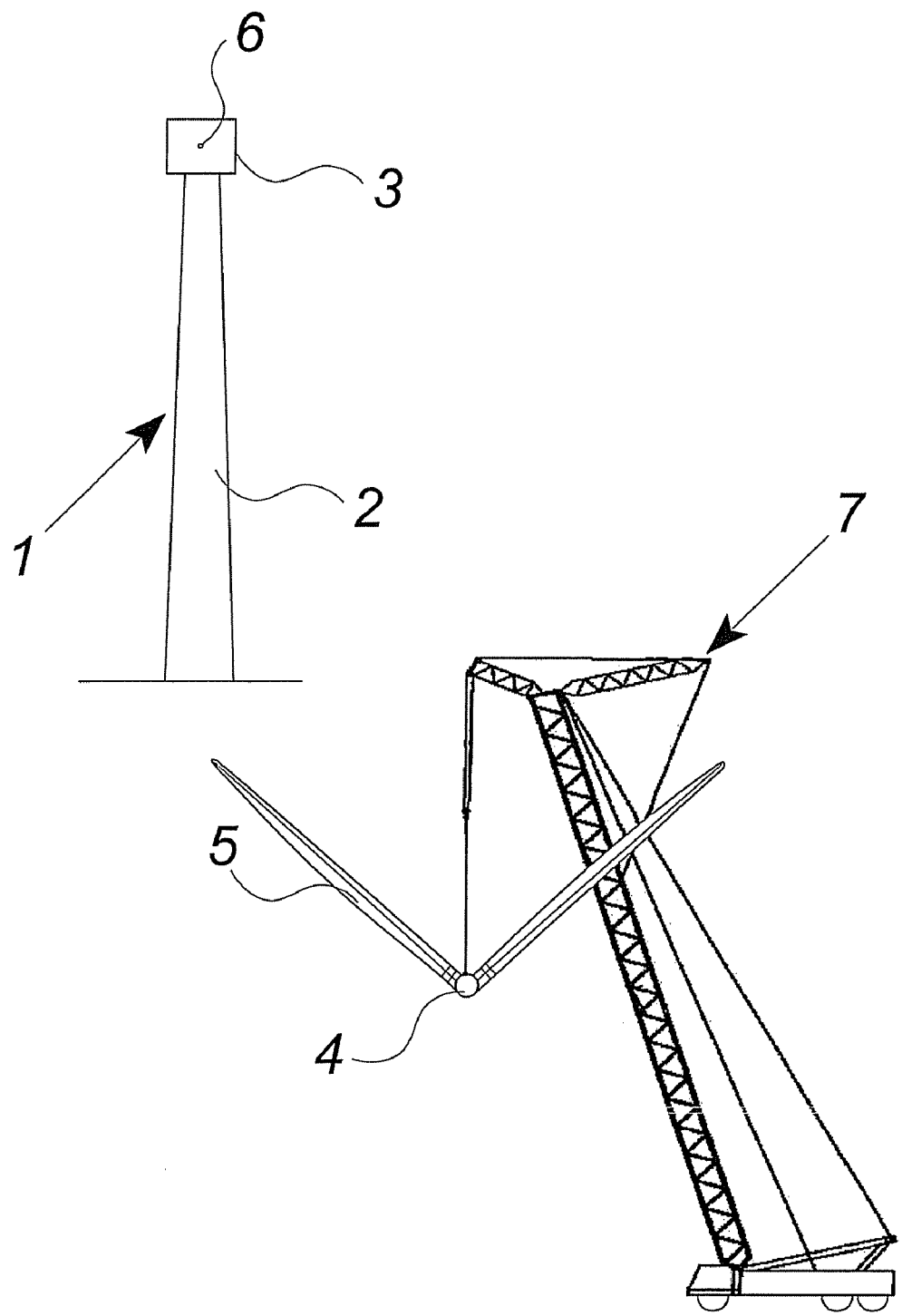
FIGS. 2a to 2c show the different steps of lifting and mounting wind turbine blades according to the invention.
Figure 2B:
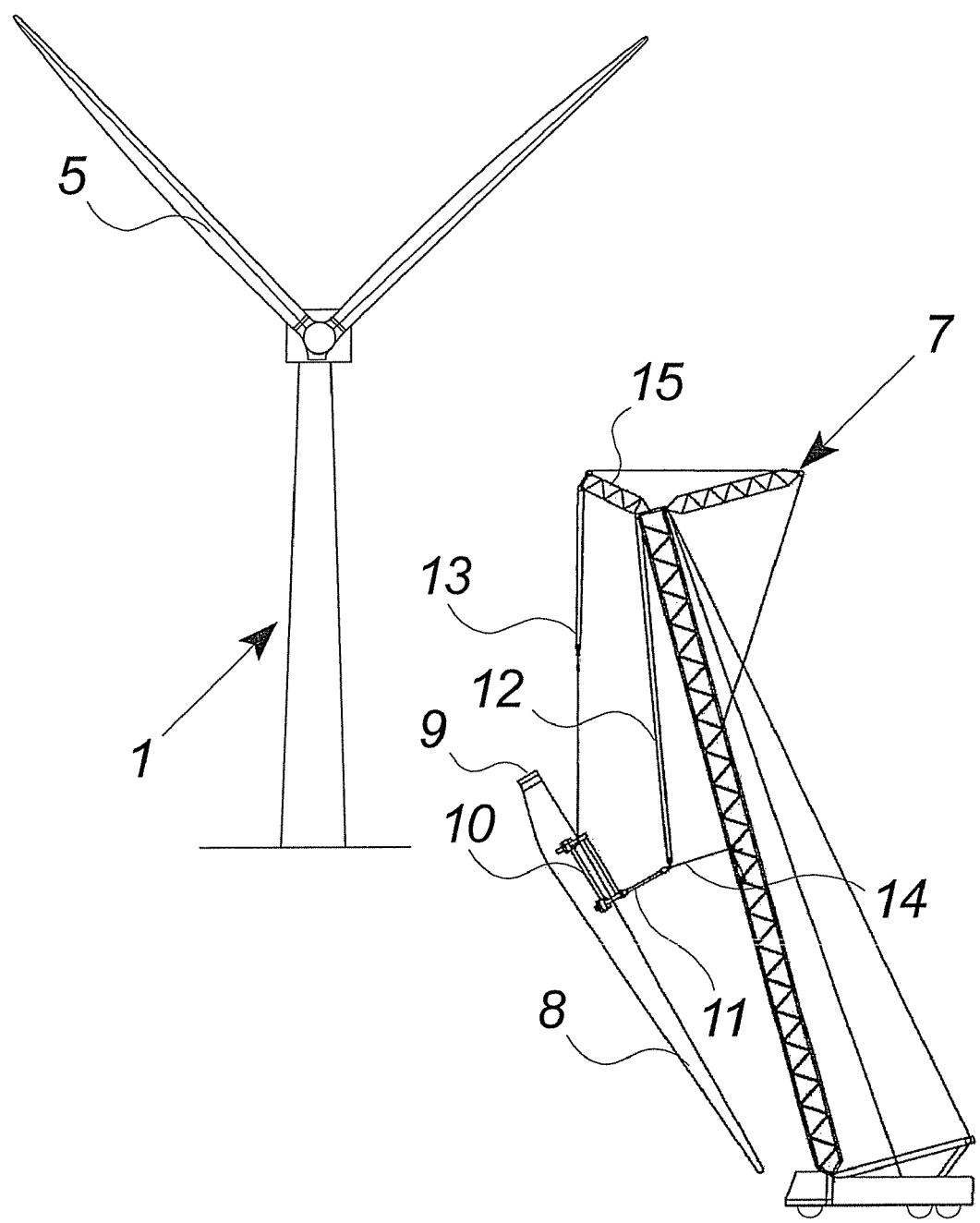
Figure 2C:
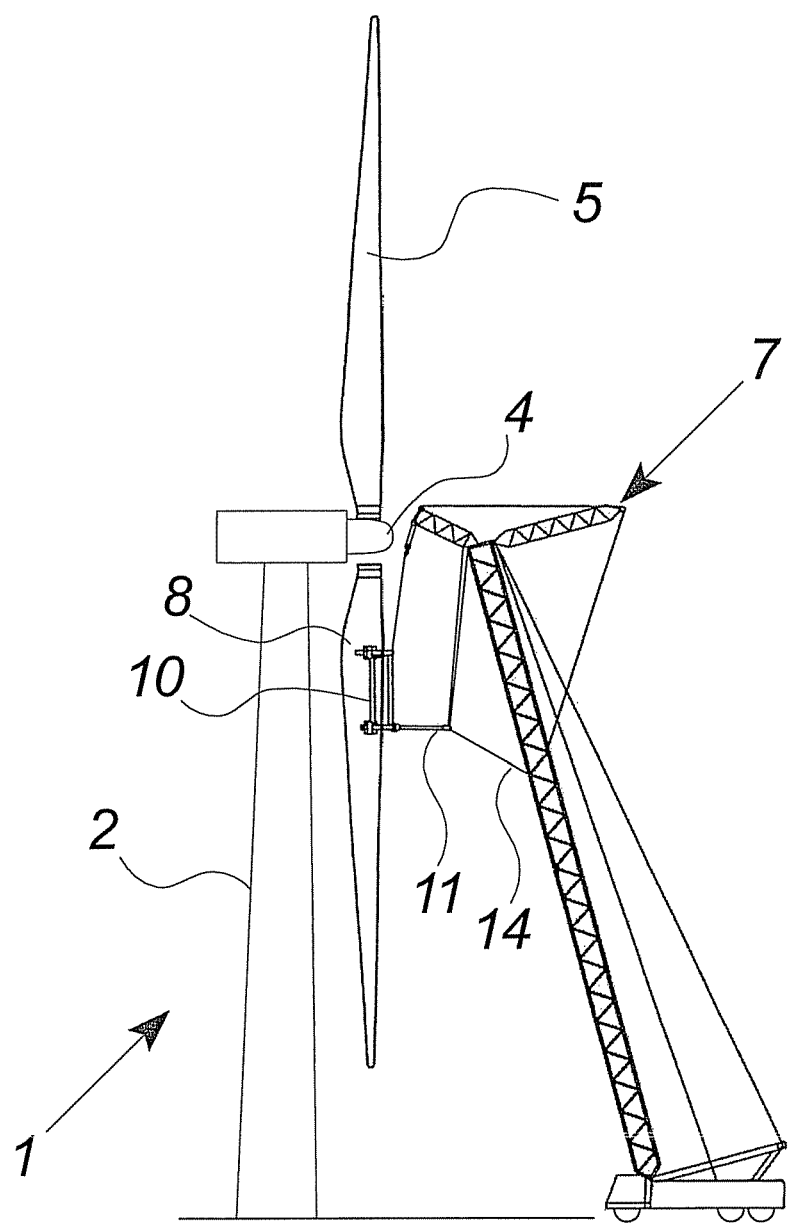

The FIGS. 2a to 2c show the different steps of lifting and mounting a wind turbine hub and three wind turbine blades according to a preferred embodiment of the invention. The wind turbine may be an on-shore or an off-shore wind turbine in which the different positions cause different problems such as the ground space within which the mounting of the rotor can be performed.

FIG. 2a shows a crane 7 lifting the rotor 5, said rotor comprising two wind turbine blades and wind turbine hub 4. The hub and the two blades are assembled on the ground and then lifted to the same height as the wind turbine nacelle 3 and in close proximity to the low speed shaft 6 extending out of the nacelle, so that they may be connected to each other.

The hub and the two wind turbine blades are maintained in a locked position with the last assembly opening for a wind turbine blade facing downwards and the two blades pointing upwards. The wind turbine blades are faced against the wind in a no production position.

FIG. 2b shows the crane 7 lifting the last wind turbine blade 8 from the ground toward the rest of the rotor 5. The blade is positioned in a gripping unit 10 close to its root end. The gripping unit 10 is shaped as a yoke which partly surrounds the wind turbine blade 8. The yoke includes a number of clamping jaws which may engage with the blade.

The gripping unit 10 also comprises a lever arm 11 with a weight at the free end of arm. The lever arm 11 is connected to the gripping unit 10 at the back of the gripping unit 10 and the back of the gripping unit is facing the tip of the wind turbine blade.

The gripping unit 10 is suspended in number of places with a number of crane wires 12, 13, 14.

The first wire 13 is connected to the front of the gripping unit 10 and the front of the gripping unit is facing the root of the wind turbine blade.

The second wire is connected to the free end of the lever arm 11 at the back of the gripping unit 10.

The first and second wires are also connected to the crane 7 through two separate positions on a crane bar/jip 15 above the blade. With the crane motor and the two different wires, it is possible to rotate the blade from a horizontal position into a vertical position (as shown in FIG. 2c).

The third wire 14 is also connected to the free end of the lever arm 11 at the back of the gripping unit 10. The wire is also connected to the main body of the crane and is usually vertical but moves into horizontal during lifting. With the crane motor and the wire, it is possible to control the blade 8 and keep it from moving horizontally when it is not required.

FIG. 2c further shows the wind turbine blade 8 lifted to a position just below the wind turbine 1 at the assembly opening in the hub 4. The blade is faced against the wind in a non-production position.

The assembly workers previously having assembled the hub and the low speed shaft may perform the assembly of the blade 8 and the hub 4 in a normal manner.

After the assembly of the blade 8 and the hub 4, the rotor is complete and the locking means may hereafter be removed in order to allow the wind turbine to start energy production.

During lifting of the blade from a horizontal position into a vertical position, the lever arm 11 and the weight make it easier to control the blade 8.

In a preferred embodiment of the invention, lifting of the blade is performed with further control wires being connected to the blade, e.g. with a flexible cuff or a similar flexible band surrounding part of the tip of said blade. The wires may be controlled with winches on the ground or positioned on the crane and used to control the movement of the blade, e.g. control the position of the blade tip during lifting.

In an alternative embodiment of the invention, the hub with the two blades is mounted on the nacelle and the crane lifts the nacelle and the hub with the blades in one lift to the top of the wind turbine tower. Hereafter, the last wind turbine blade is lifted with the gripping unit 10 just below the hub in the vertical position and the blade is mounted on the hub.

Figures 3A, 3B:
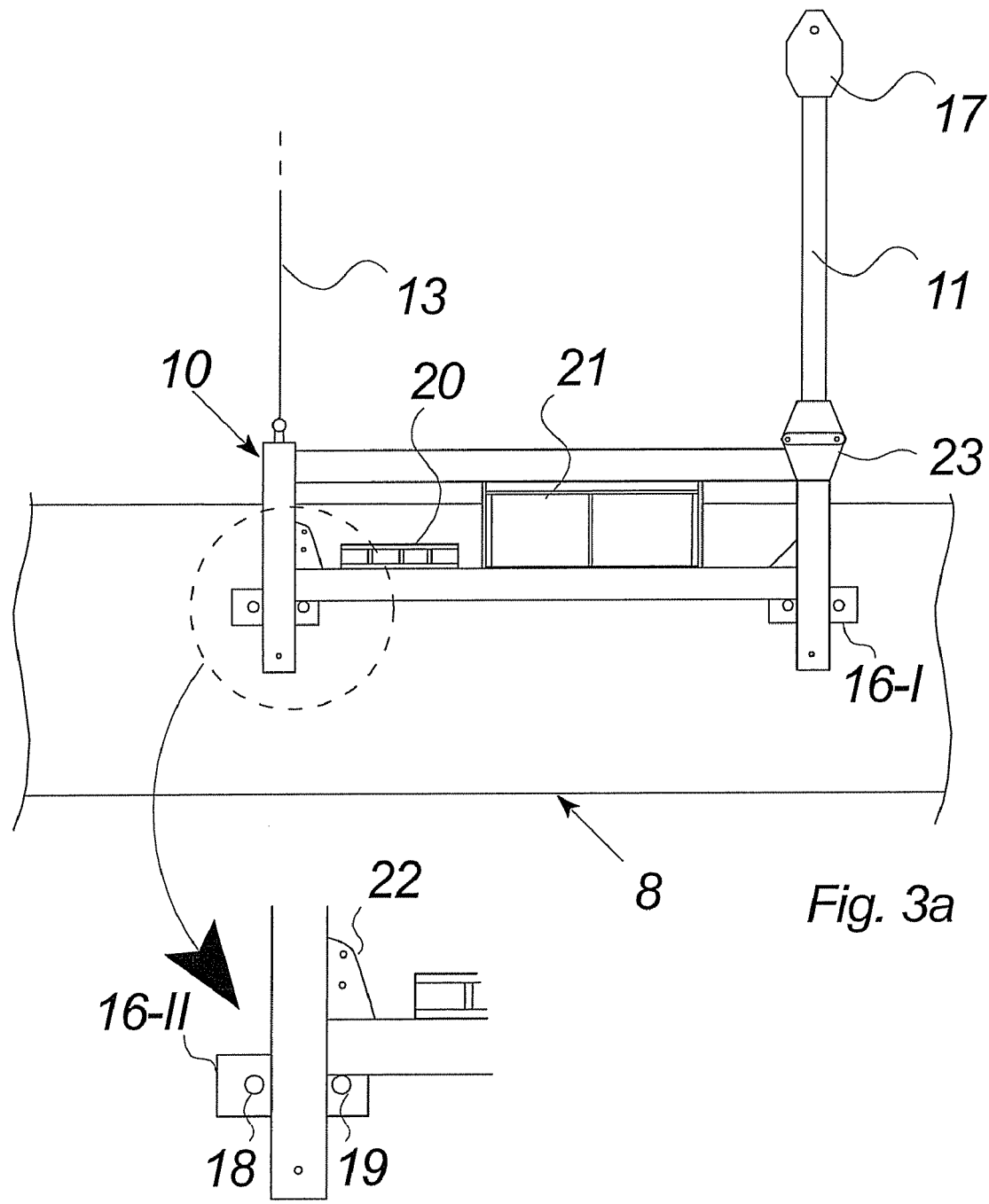
FIG. 3a shows a preferred embodiment of a gripping unit according to the invention.
FIG. 3b shows a magnified section of FIG. 3a, FIG. 3c shows a front view of the preferred embodiment of the gripping unit and magnified sections of the figure.

FIG. 3a shows a preferred embodiment of a gripping unit 10 according to the invention. The gripping unit 10 comprises a number of steel bars perpendicularly connected in order to create a yoke capable of surrounding the wind turbine blade 8.

In the four-sided window created by the steel bars, a section of electric accumulators 20 supplying the necessary electric power for a hydraulic system, the control systems and other systems needing electric power is mounted. Some of the hydraulic components and control systems are positioned in the control box or cabinet 21. The hydraulic components may be a hydraulic tank containing hydraulic oil and a hydraulic pump supplying hydraulic pressure to the rest of the hydraulic system. The necessary electric power to the electric motor driving the hydraulic pump is supplied from the electric accumulators 20.

The lever arm 11 may be constructed as two separate arms extending from the gripping unit 10 and with the free ends of the arms being connected to the weight 17 as a bar between the arms.

The weight 17 may be comprised by a number of different materials such as concrete blocks or metal plates e.g. lead plates. The weight may also be made (more or less) solidly in a heavy metal such as steel.

In a preferred embodiment, the total mass of the weight 17 is between 1 and 5 tons such as approximately 2.2 tons.

FIG. 3b shows a magnified section of FIG. 3a in relation to the gripping unit 10. The section includes a first and a second bar connected to a furnishing 22 in a perpendicular connection establishing one corner of the yoke surrounding the wind turbine blade 8.

Close to the perpendicular connection, the second gripping mechanism 16-II is positioned. The second gripping mechanism 16-II includes a hydraulic actuator 18 and a backup actuator 19 whose ends may be seen in FIG. 3b. The rods of the actuators 18, 19 are connected to a clamping jaw that may be pushed against the side of the wind turbine blade positioned within the yoke of the gripping unit 10.

The two actuators 18, 19 are of the same type, have the same connection to the hydraulic system and thus have the same functionality. If the hydraulic actuator 18 fails, the backup actuator will still hold the clamping jaw and thus the wind turbine blade 8.

Figure 3C:
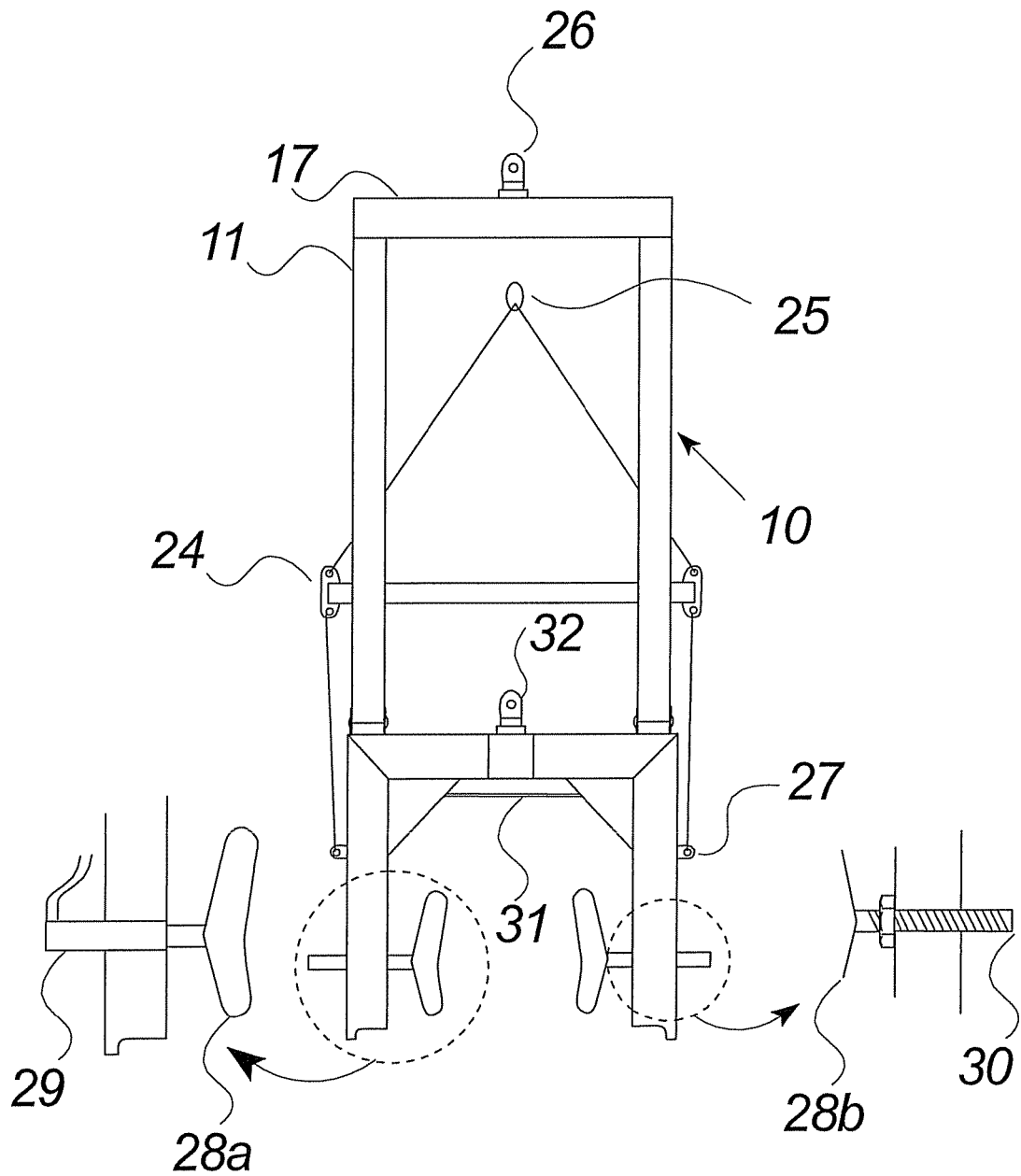
FIG. 3d shows a top view of the preferred embodiment of the gripping unit.
FIG. 3e shows the preferred embodiment of the gripping unit in relation to a center point of the wind turbine blade.
FIG. 3f shows a preferred embodiment of a clamping jaw seen from the side and the front.

FIG. 3c shows a front view of the preferred embodiment of the gripping unit 10.

The yoke surrounding the wind turbine blade comprises a number of bars b4, b7, b8 connected by furnishings 22.

The first crane wire 13 is connected to the front of the gripping unit 10 through a traverse system comprising a first connection eyelet 25 and two wires stretched over a traverse bar 24 and connected to opposite sides of the gripping unit 10.

The figure further shows the lever arm 11 constructed as two separate arms extending from the gripping unit 10 with the free ends of the arms being connected with the weight 17 as a bar between the arms.

On top of the weight 17, the second connection eyelet 26 is positioned. The eyelet is used for connections of second and third crane wires 12, 14.

In the lever arm, close to the connection point with the yoke of the gripping unit 10, a hinge 23 is incorporated. The hinge allows the lever arm and the weight 17 to be moved from an upright lifting position to a fold-down transportation position and vice versa.

The magnified sections of the figure show the first and most of the second clamping jaw in a set 28a, 28b.

The first clamping jaw is stepless and movable towards one side of a wind turbine blade. The hydraulic actuator and the backup actuator 18, 19, establish the movement of the first clamping jaw 28a. The movement of the actuators may be controlled and ultimately stopped by a hydraulic pressure valve indicating that the first clamping jaw has reached the wind turbine blade and is pushing it against the passive second clamping jaw 28b at a certain force.

The second clamping jaw is fixedly connected to the gripping unit 10 but in a changeable manner e.g. by providing the rod 30 connecting the jaw and the gripping unit 10 with a screw thread. The rod may be positioned in a given fixed position but if the clamping jaw or the position of the clamping jaw needs to be changed, this may be achieved by screwing the rod partly or totally out of the gripping unit 10. The clamping jaw can be changed if different types of blades with e.g. other dimensions than those of the previously lifted blades are to be lifted.

The gripping unit 10 further comprises a rubber surface 31 or a similar surface on the bar side facing down against the top of the wind turbine blade. The rubber surface protects the blade against damage during transport and lifting.

The front of the first and second clamping jaws 28a, 28b may also be separated from the rest of the clamping jaw system by removing the front from the rods 37 and replacing them with another front having other dimensions.

Figure 3D:
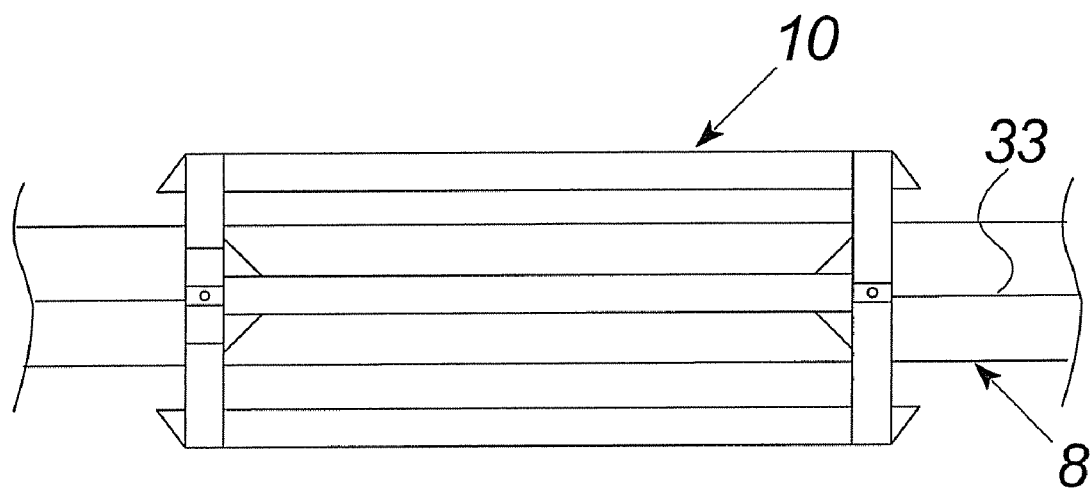

FIG. 3d shows a top view of the preferred embodiment of the gripping unit 10 with the wind turbine blade 8 positioned inside the yoke defined by the gripping unit 10.

The figure shows three bars b1, b2, b3 parallel with the blade. The first and third bars b1, b3 are positioned above the blade on opposite sides of the wind attack edge 33 of the blade. The second bar is positioned above the wind attack edge 33 of the blade. The three bars b1, b2, b3 are connected by two perpendicular bars b4, b5 at both ends of the bars by means of furnishings 22.

As shown in FIG. 3a, the bar structure is continued down the sides of the gripping unit 10 and thus creates a rigid yoke structure gripping a wind turbine blade.

Figure 3E:
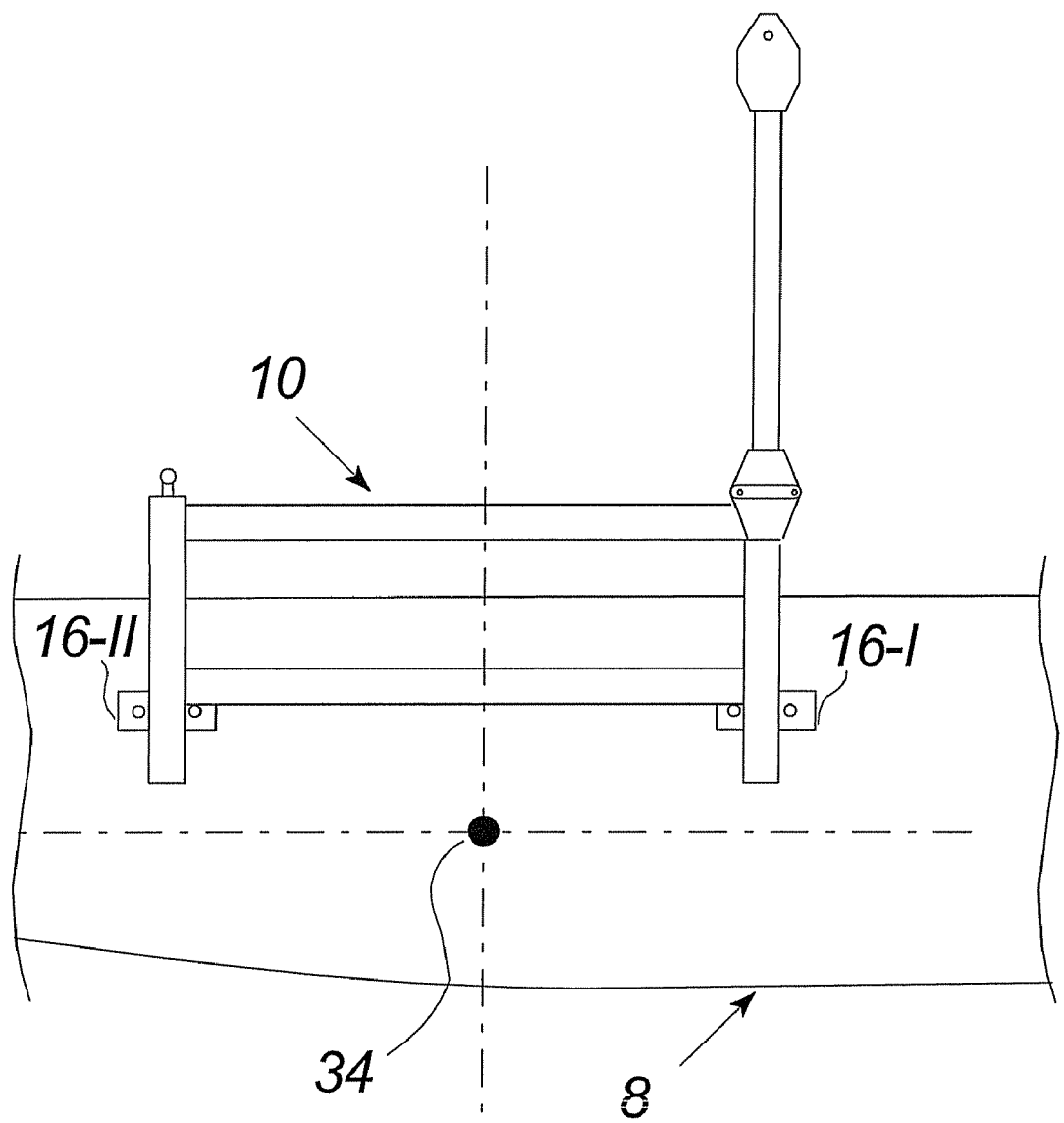

FIG. 3e shows the preferred embodiment of the gripping unit 10 in relation to the center point 34 of the wind turbine blade 8. The center point is the transverse mass center of the wind turbine blade.

As shown, the two clamping jaws are positioned on opposite sides of the center point and substantially at the same distance from the center point. The gripping unit 10, including the lever arm 11 and the weight 17, will be in balance with the wind turbine blade when in vertical position.

The upper side of the gripping unit 10 further shows a second connection eyelet 26 and a third connection eyelet 32 used for connection of the crane wires 12, 13, 14.

The wind turbine blade 8 is shown with the blade tip positioned to the left and the blade root to the right (but outside the figure).

Figure 3F:
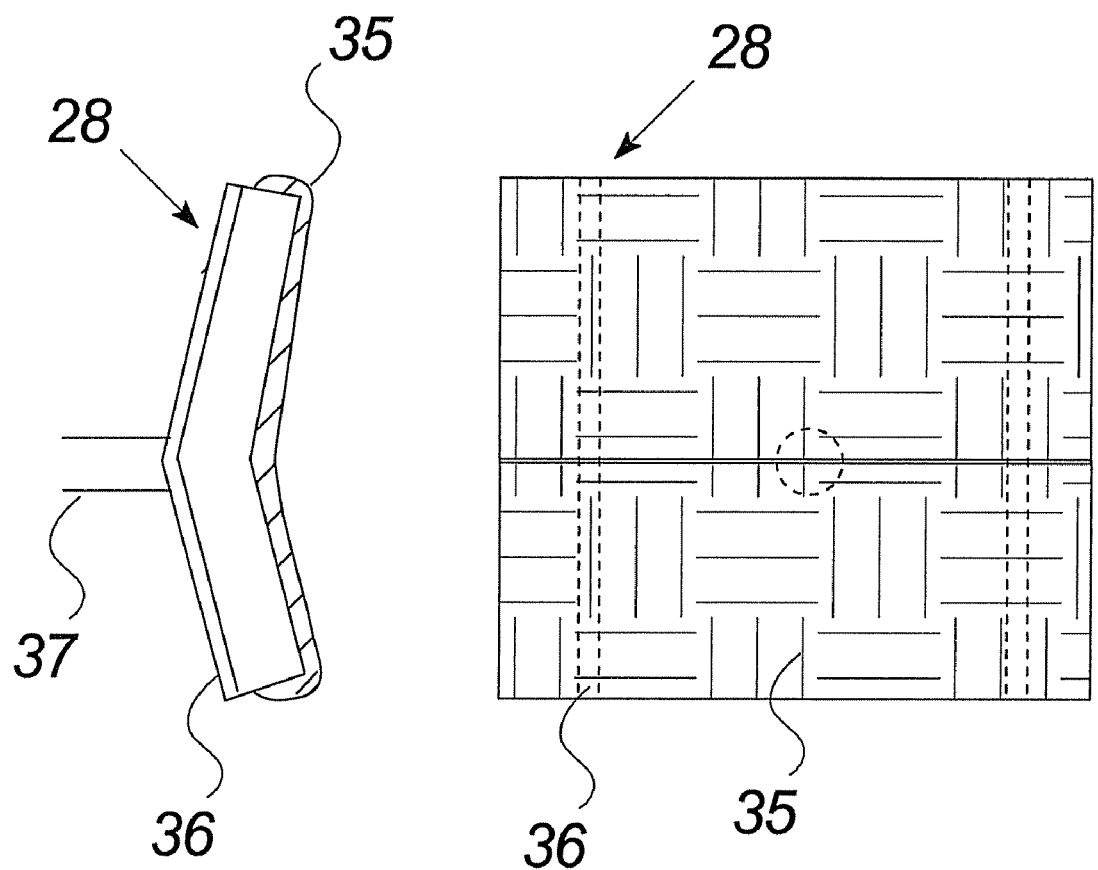

FIG. 3f shows a preferred embodiment of a clamping jaw 28 according to the invention in which the clamping jaw is seen from the side and the front.

The clamping jaw 28 comprises one or more steel plates shaped to meet a given surface of a wind turbine blade type in a specific position on the blade. In the shown figure, the clamping jaw 28 comprises an upper and lower plate welded together at an angle substantially meeting the surface of the wind turbine blade.

To ensure the necessary rigidity of the clamping jaw 28 in the vertical direction, it has a number of strengthening ribs 36. The ribs basically have the same height as the clamping jaw 28 and are welded onto the back of the jaw at a certain distance between the ribs. In another embodiment, the strengthening of the clamping jaw 28 is obtained by one large rib mounted on the back of the jaw.

The clamping jaw 28 is also covered with a friction surface toward the wind turbine blade in order to secure a firm grip of the blade. The friction surface may be vulcanized rubber with a tread pattern 35 to further ensure a firm grip of the blade without making marks on it. The thread pattern 35 includes one or more dents which will catch any water drops or moisture from the surface of the wind turbine blade or the surroundings in general. By catching the water in dents, it is ensured that the water does not weaken the ability of the friction surface to hold on to the wind turbine blade as the water is kept away from the friction surface.

The thread pattern 35 may be a pattern similar to the patterns known from vehicle tires, such as rain tires, with patterns developed for leading rain away from the friction surface in an improved manner.

Figure 4A:
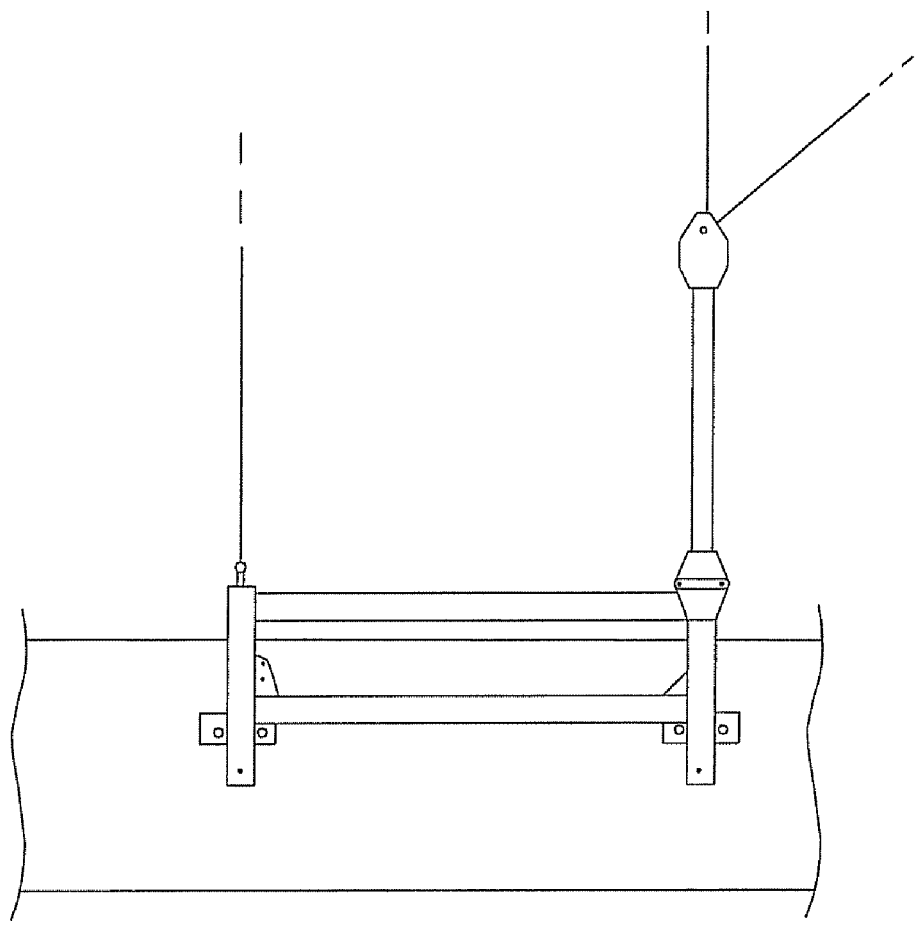
FIGS. 4a to 4c show different positions of the preferred embodiment of the gripping unit.
Figure 4B:
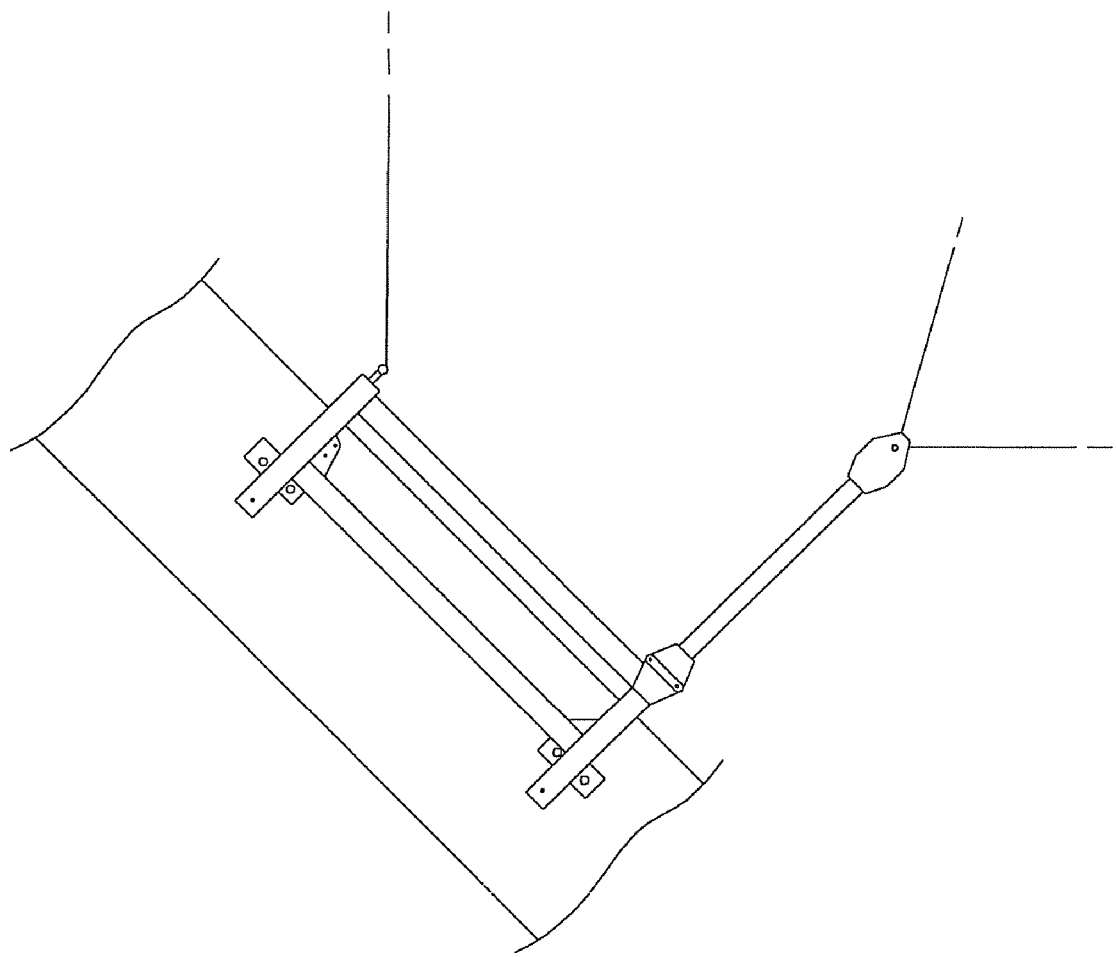
Figure 4C:
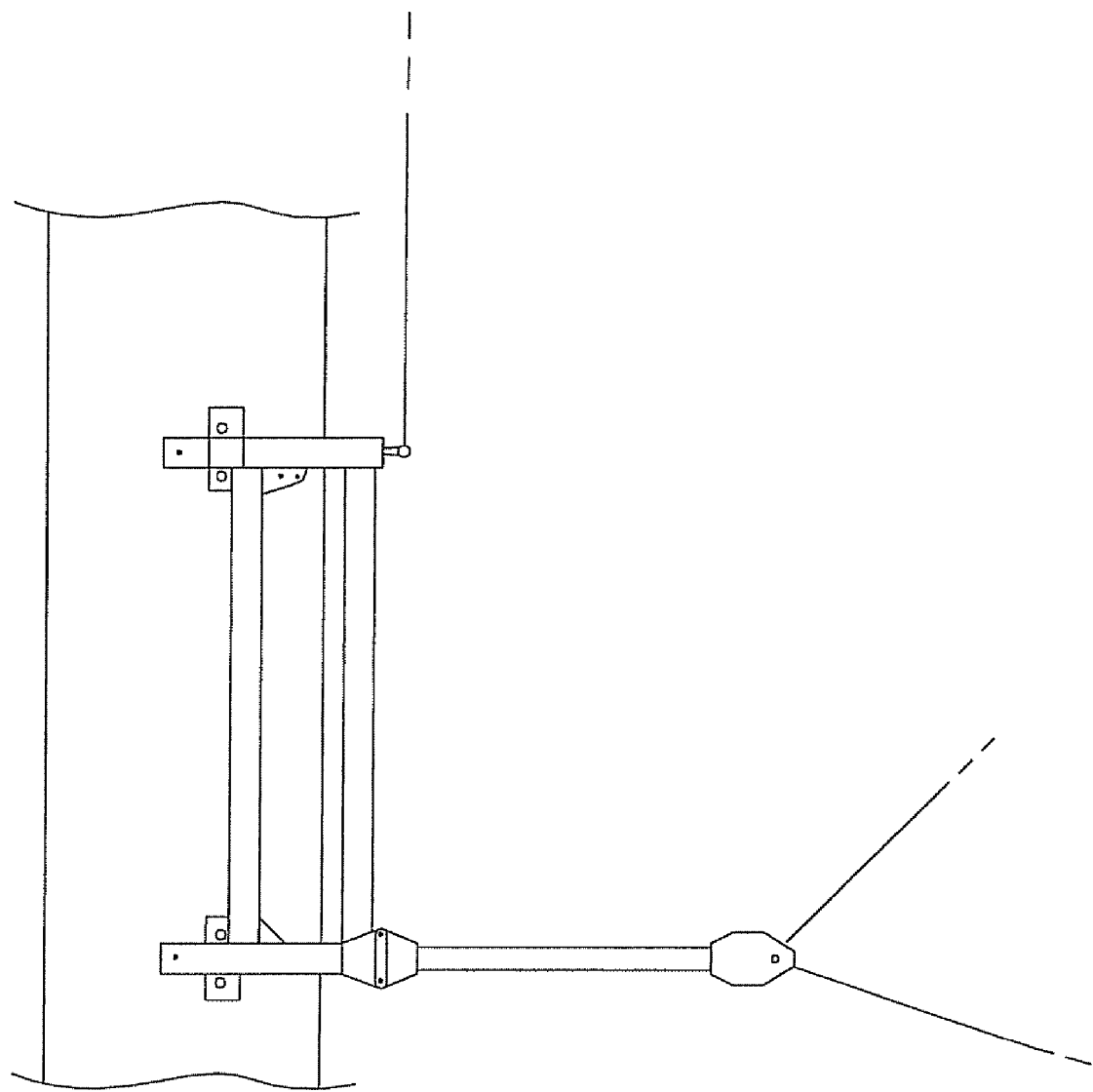

FIGS. 4a to 4c show different positions of the preferred embodiment of the gripping unit 10 during lifting of a wind turbine blade.

FIG. 4a shows the gripping unit 10 in a substantially horizontal position which is the initial position when lifting the wind turbine blade from the ground to the final assembly position.

In the present horizontal position, the wind turbine blade has just been lifted from the ground or from a truck, a ship or another means of transportation delivering the blade to the wind turbine site.

As shown, the first and second crane wires 12, 13 are substantially vertical and the third crane wire 14 is substantially horizontal. The first and second crane wires 12, 13 lift the gripping unit 10 and the wind turbine blade 8. The two are initially lifted above ground while kept in a substantially horizontal position.

The third crane wire 14 ensures that the lifted items are kept under control in a horizontal plane.

FIG. 4b shows the gripping unit 10 and a wind turbine blade 8 in a later situation than that of FIG. 3a.

As shown, the first crane wire 12 pulls harder at the front of the gripping unit 10 than the second crane wire 11 at the back of the gripping unit 10. The gripping unit 10 and the blade 8 thus turn and are no longer horizontal.

The lever arm and the weight support the turn, as gravity will pull them down and thus boost the turn.

FIG. 4c shows the gripping unit 10 and the wind turbine blade 8 in the final vertical position. The turn has reached its end and the blade is ready to be assembled with the wind turbine hub.

Figure 5:
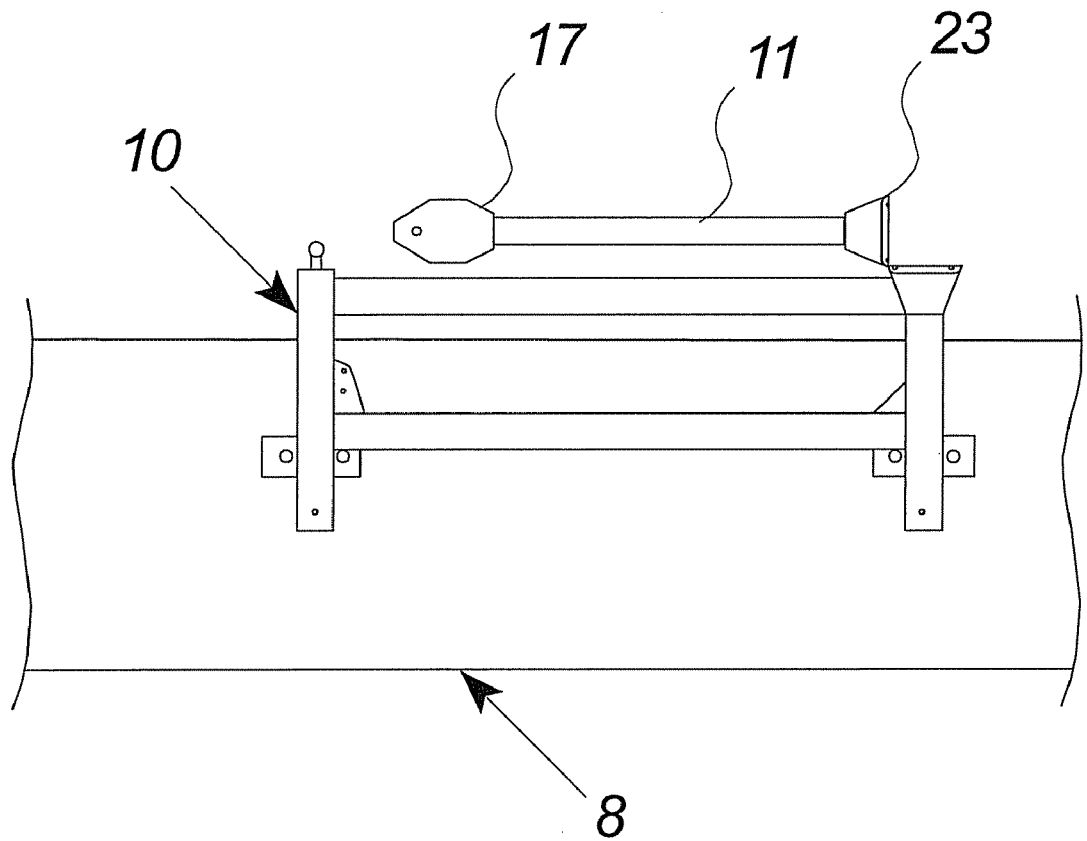
FIG. 5 shows a preferred embodiment of the gripping unit with the lever system in transport position.

FIG. 5 shows the gripping unit 10 with the lever system 11, 17 in a transport position.

The transport position allows a compact system with less distance between the mass centers of the wind turbine blade 8 and the gripping unit 10.

The transportation position is obtained by opening the hinge 23, lowering the lever arm 11 and the weight 17 to the top of yoke and fastening the lever arm 11 and the weight 17.

Figure 6:
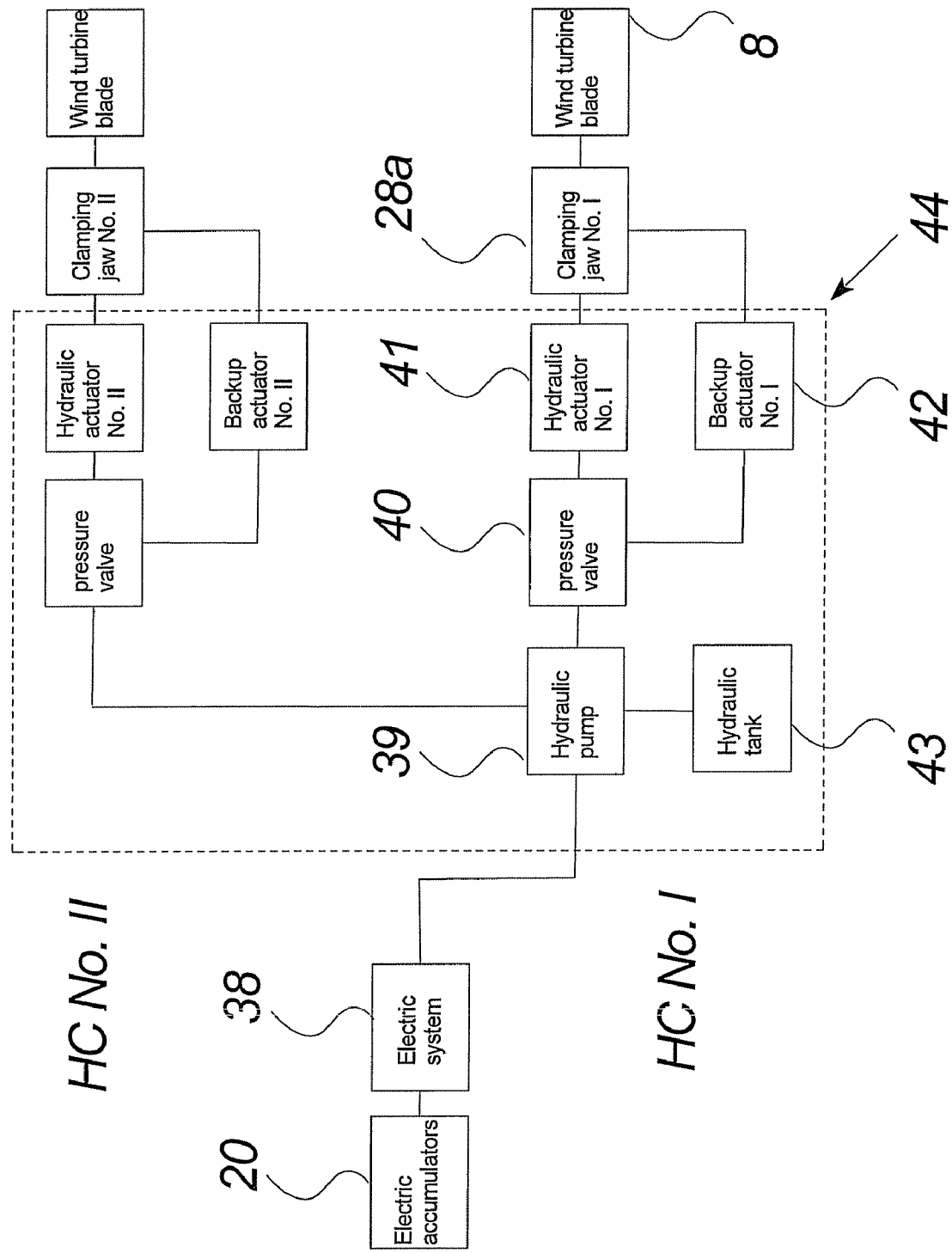
FIG. 6 shows a flow chart of the functionality of a preferred embodiment of a lifting system according to the invention.

FIG. 6 shows a flow chart of the functionality of a preferred embodiment of a lifting system according to the invention.

The lifting system includes a mechanical, a hydraulic and an electric system.

The mechanical system includes a first clamping jaw 28a (No. I) and another first clamping jaw 28a (No. II) actively pressing against one side of a wind turbine blade 8 in two different positions. On the other side of the blade, two second clamping jaws 28b passively create the necessary counter pressure on the first set of clamping jaws 28a.

At the same time, the first clamping jaw 28a (No. I) is moved and controlled by a hydraulic actuator 41 and a backup actuator 42.

The actuators are part of a hydraulic system 44 which comprises a hydraulic pump 39 pumping hydraulic oil from a hydraulic tank 43 to the hydraulic actuators and the backup actuators moving and controlling the clamping jaws 28a (Nos. I and II).

Pressure valves 40 control the pressure allowed by the hydraulic actuators and the backup actuators. By controlling the pressure at the actuators, and thus the clamping jaws, it is possible to control the holding force on the wind turbine blade.

The electric system 38 includes an electric motor driving the hydraulic pump as well as electric accumulators 20 supplying the necessary electric power to the motor and other components in the electric system.

Other embodiments of the lifting system may be established within the scope of the invention.

The lifting unit with the lever arm and at least one weight may be moved substantially 90 degrees in movement, from lifting position into transportation position.

To achieve max. moment of force during lifting, it is important that the weight is positioned as far away from the blade as possible and that the lifting unit with the lever arm and the weight are as compact as possible during transportation. In order to meet these requirements, it is advantageous to have the lever arm and the weight moved from a position of close proximity to the blade (0 degrees in relation to the blade) to a position as far away from the blade as possible (90 degrees in relation to the blade). In a further embodiment, the lever system may perform a stepless movement from a transportation position to a lifting position or from one lifting position to another. The embodiment may require control of the moment e.g. by means of hydraulic actuators.

What is claimed is:

1. Method of handling wind turbine blades, said method comprising:
providing a lifting system including at least one gripping unit for handling wind turbine blades, said unit comprising gripping means with a curved surface adapted to a shape of a wind turbine blade,
gripping at least one wind turbine blade with said lifting system by connecting the gripping means to the wind turbine blade, and
lifting the at least one wind turbine blade with the lifting system.

2. Method according to claim 1, wherein the gripping unit performs the gripping by forcing a number of clamping jaws against sides of the wind turbine blade in at least two lifting positions.

3. Method according to claim 1, wherein the gripping unit grips a wind turbine blade in at least two lifting positions, said lifting positions being symmetrically positioned around a center point of said wind turbine blade.

4. Method according to claim 1, wherein said at least one wind turbine blade is controlled by one or more wires connected to at least one crane or to one or more winches.

5. Gripping unit for handling a wind turbine blade, said unit comprising gripping means having a curved surface adaptable to a shape of specific types of wind turbine blades and comprising at least two gripping points for engaging with surfaces of said wind turbine blades.

6. Gripping unit according to claim 5, wherein said gripping means is changeable from one size to another.

7. Gripping unit according to claim 5, wherein said gripping means includes at least one adjustable clamping jaw connected to a hydraulic, an electric or a pneumatic system for stepless adjustment of a position of the clamping jaw in relation to said wind turbine blade and at least one fixed clamping jaw, said jaws forming a clamping jaw set.

8. Gripping unit according to claim 7, wherein said gripping means includes two sets of said clamping jaws for engaging with the surface of said wind turbine blade, said sets being adapted to a given wind turbine blade type.

9. Gripping unit according to claim 7, wherein said clamping jaws include a friction surface layer.

10. Gripping unit according to claim 9, wherein said friction surface layer comprises vulcanized rubber.

11. Gripping unit according to claim 9, wherein said friction surface layer comprises at least one tread pattern including one or more dents.

12. System for handling wind turbine blades, wherein said system comprises a gripping unit according to claim 5 and a lifting system.

13. System for handling wind turbine blades according to claim 12, wherein said lifting system includes a crane with a number of wires lifting and controlling said gripping unit.

14. System for handling wind turbine blades according to claim 12, further comprising at least one additional wire controlling at least one wind turbine blade is connected to said blade with connection means comprising a flexible cuff or a similar flexible band surrounding a part of a tip of said blade.

* * * * *